(12) United States Patent
Doynow

(10) Patent No.: US 7,398,246 B2
(45) Date of Patent: Jul. 8, 2008

(54) METHOD AND SYSTEM FOR MANAGING A MORTGAGE REBATE TRANSACTION CARD ACCOUNT

(75) Inventor: Gina Doynow, New York, NY (US)

(73) Assignee: Citicorp Credit Services, Inc., Long Island City, NY (US)

( * ) Notice: Subject to any disclaimer, the term of this patent is extended or adjusted under 35 U.S.C. 154(b) by 134 days.

(21) Appl. No.: 10/989,229

(22) Filed: Nov. 15, 2004

(65) Prior Publication Data

US 2005/0108132 A1    May 19, 2005

Related U.S. Application Data

(60) Provisional application No. 60/519,278, filed on Nov. 13, 2003.

(51) Int. Cl.
*G06Q 40/00* (2006.01)
(52) U.S. Cl. .............................. 705/38; 705/39; 705/14
(58) Field of Classification Search ................... 705/14, 705/38–41
See application file for complete search history.

(56) References Cited

U.S. PATENT DOCUMENTS

| | | | |
|---|---|---|---|
| 5,970,480 A | 10/1999 | Kalina | |
| 6,222,914 B1 * | 4/2001 | McMullin | 379/144.01 |
| 6,243,688 B1 | 6/2001 | Kalina | |
| 6,631,358 B1 | 10/2003 | Ogilvie | |
| 7,072,851 B1 * | 7/2006 | Wilcox et al. | 705/14 |
| 2001/0044772 A1 | 11/2001 | Allen et al. | |
| 2001/0054003 A1 | 12/2001 | Chien et al. | |
| 2002/0069150 A1 * | 6/2002 | Ni | 705/36 |
| 2002/0096561 A1 * | 7/2002 | Sullivan | 235/379 |
| 2002/0147669 A1 | 10/2002 | Taylor et al. | |
| 2002/0161630 A1 | 10/2002 | Kern et al. | |
| 2003/0135442 A1 | 7/2003 | Kumar et al. | |
| 2003/0191702 A1 | 10/2003 | Hurley | |
| 2003/0225688 A1 | 12/2003 | Dobbins | |

FOREIGN PATENT DOCUMENTS

WO    WO 02/065246 A2    8/2002

(Continued)

OTHER PUBLICATIONS

"Wells Fargo's Rebate Card", The New York Times, nytimes.com. p. 1, Apr. 19, 1993.*

(Continued)

*Primary Examiner*—Hani M. Kazimi
(74) *Attorney, Agent, or Firm*—George T. Marcou; King & Spalding LLP

(57) ABSTRACT

A method and system of managing a mortgage rebate transaction card account in which a transaction card provider computes a mortgage rebate amount based on the amount of charges incurred against the account and periodically arranges for application of the mortgage rebate amount against a mortgage loan balance for the cardholder. The account is provided by the transaction card provider in connection with either a pre-existing mortgage loan of the cardholder or a prospective mortgage loan of the cardholder. Further, the account can be provided in connection with a mortgage loan from any mortgage lender regardless of the existence or non-existence of an affiliation or association between the transaction card provider and the mortgage lender.

15 Claims, 5 Drawing Sheets

FOREIGN PATENT DOCUMENTS

WO      WO 03/098495 A1      11/2003

OTHER PUBLICATIONS

Kleege, S., "Wells launches credit card that offers mortgage rebate", American Banker, vol. 158, No. 73, p. 2, Apr. 19, 1993.

"Wells Fargo's William Zuendt", Institutional Investor, vol. 28, No. 7, p. 49, Jul. 1994.

Block, V., "GM turns up the heat with plan to cross-sell some financial products", American Banker, vol. 159, No. 222, p. 16, Nov. 18, 1994.

"Principal Bank Gives a 'Kick-Start' to Personal Savings; Virtual Bank Has One-of-a-Kind Savings Reward Credit Card", PR Newswire, p. 5449, Aug. 24, 1999.

"State Farm Bank Now Offering Visa Credit Cards", Apr. 9, 2001.

"Mortgage Equity Card", www.cardweb.com, May 12, 2004.

"GMAC and MBNA Marketing Equity Rewards Card", Mortgage Line, vol. 6, Iss. 3, p. 16, Jun. 15, 2004.

BerGquist, E., "GMAC Offers Auto Deduction Award.(GMAC Mortgage Corp.)", American Banker, 2004.

"Merrill Lynch Clients to Earn Valuable Rewards Points for Home Financing; Limited Time Offer for Merrill+ and Visa Signature Cardholders", Business Wire, Jul. 12, 2004.

"VISA Financial Rewards Program Rules and Point Redemption", Thrivent Financial Bank.

\* cited by examiner

METHOD AND SYSTEM FOR MANAGING A MORTGAGE REBATE TRANSACTION CARD ACCOUNT

PRIORITY APPLICATION

This application claims the benefit of U.S. Provisional Application No. 60/519,278 filed Nov. 13, 2003, entitled "HOME REBATE CREDIT CARD", which is incorporated herein by this reference.

FIELD OF THE INVENTION

The present invention relates generally to methods and systems for multiple use of transaction devices, and particularly to a method and system for providing incentives to consumers in the form of rebates applied to consumers' mortgages and to a potential mortgage debtor.

BACKGROUND

There is a large population of mortgage debtors in the United States. When purchasing or refinancing a home, consumers typically obtain a long-term loan from a bank or other lender. The home and often the land on which the home stands serve as collateral for the loan. The consumer, in obtaining the loan, gives the bank a lien against the property. Thus, if the consumer does not pay as scheduled, the bank can foreclose on the home.

Because home mortgages are such large loans, consumers often pay the loan in 15 or 30 years. Monthly payments slowly decrease the amount owed on the mortgage. Nevertheless, the interest on the principal accumulates over the years. As a result, consumers have a high priority to pay the loan as quickly as possible, eliminating the risk of foreclosure and minimizing the accrued interest.

Along with mortgages, many consumers utilize transaction cards, such as credit cards, to manage finances and debt. Many conventional credit cards or other financial transaction devices provide incentives to consumers to encourage use of their cards over other transaction cards or other forms of exchange. Typically, this involves using a credit card where the consumer is awarded one free frequent flier mile with a particular airline for every dollar he or she charges on his or her credit card. By receiving frequent flier miles, consumers are given an incentive to use a particular credit card over other credit cards, money, checks, and automated bank cards. Similar incentive programs include receiving points or dollars towards the purchase of merchandise or services, such as automobiles, electronic equipment, music CDs, and phone service.

Other conventional credit cards offer a cash-back rebate. For example, one credit card issuer has a dividend product that provides one percent cash-back to the consumers on their purchases. Other credit cards provide a cash rebate to consumers of between one and five percent. Typically, the five percent cash-back rebate is limited to certain categories of purchases or revolving balances. The cash back is given directly to the consumer. However, most credit cards require consumers to earn a specified amount of a rebate before actually receiving the rebate. Additionally, there is usually a maximum limit, i.e., a cap, to the amount consumers can receive as a rebate.

No credit card provides a rebate that assists consumers in paying their mortgage. Further, no credit card has a rebate without a cap that applies the rebate directly to a mortgage. There is a current need for a credit card that caters to mortgage debtors.

SUMMARY OF THE INVENTION

It is a feature and advantage of the present invention to provide a transaction card account designed for a consumer who is either a mortgage debtor, potential mortgage debtor, or is currently obtaining a pre-approval for a mortgage.

It is another feature and advantage of the present invention to provide a transaction card account that helps the consumer pay down his or her mortgage simply by using the transaction card.

It is a further feature and advantage of the present invention to provide a transaction card account that offers a percentage rebate, such as one percent, for which the rebate amount earned during each calendar year is provided on a cardholder's behalf to the cardholder's mortgage lender of record as a pre-payment towards his or her mortgage principal balance.

It is an additional feature and advantage of the present invention to provide a mortgage rebate transaction card that offers rebates to consumers in the form of credits to the mortgage principal, and also allows consumers to earn rebates on the up-front mortgage application fee at the point-of-sale.

To achieve the stated and other features, advantages and objects, embodiments of the present invention utilize, for example, computer hardware, operating systems, programming languages, software applications, and other technology to provide a transaction, such as a credit card, which furnishes rewards to cardholders when executing transactions with the credit card. The rewards are realized as a cash rebate that may be applied to the principal balance of a mortgage or a future mortgage. There is no cap on the value of the rebate that may be earned, and the rebate is accumulated and applied to the mortgage principal periodically, such as once annually.

In an embodiment of the invention, when an individual applies for a mortgage, a determination is made as to whether the applicant qualifies for the credit card. Qualified applicants are offered the credit card. Upon acceptance of the credit card offer, application related costs may be applied to a temporary account. Additional credit and fraud checks are performed. If the applicant is finally approved, the credit card is issued and the application related costs appear on the first credit card statement. If the applicant is subsequently not approved, then a request for alternative payment of application related costs is issued. Alternatively, the consumer may obtain the mortgage rebate card through conventional means, including, but not limited to, a separate mortgage company.

In particular, embodiments of the invention provide methods and systems of managing a mortgage rebate transaction card account in which a transaction card provider furnishes the account to a cardholder and allows the cardholder to incur charges against the account. Thereafter, the transaction card provider computes a mortgage rebate amount based on the amount of charges incurred against the account and periodically arranges for application of the mortgage rebate amount against a mortgage loan balance for the cardholder.

An aspect of the invention involves providing the mortgage rebate transaction card account by the transaction card provider in connection with either a pre-existing mortgage loan of the cardholder or a prospective mortgage loan of the cardholder. In the latter case, the mortgage rebate transaction card account may be provided in connection with approval of an application for a mortgage loan by the cardholder, and the cardholder may be allowed to charge the mortgage loan application fee against the account.

An embodiment of the invention proposes that the cardholder is provided an option for the mortgage rebate transaction card account either in connection with a mortgage loan from a mortgage lender that is affiliated or associated with the transaction card provider or in connection with a mortgage loan from mortgage lender that is not affiliated or associated with the transaction card provider. Thus, the transaction card provider may provide the account for the cardholder in connection with a mortgage loan from any mortgage lender regardless of the existence or non-existence of an affiliation or association between the transaction card provider and the mortgage lender.

In an embodiment of the invention, the mortgage rebate amount is computed without imposing a maximum limit. Further, the transaction card provider can arrange for application of the amount directly against the mortgage loan balance in the form of an annual credit to the cardholder's mortgage loan balance based, for example, on an anniversary date of the mortgage rebate transaction card account, and the mortgage rebate amount can be paid directly to the mortgage lender by the transaction card provider by electronic transfer or check. However, under certain circumstances, mortgage rebate amount can be paid to the cardholder via account credit or check. In any event, the cardholder's computed mortgage rebate amount is likewise decremented by an amount equal to the amount applied to the cardholder's mortgage loan balance.

Additional objects, advantages and novel features of the invention will be set forth in part in the description which follows, and in part will become more apparent to those skilled in the art upon examination of the following, or may be learned from practice of the invention.

DETAILED DESCRIPTION

Figure 1A:
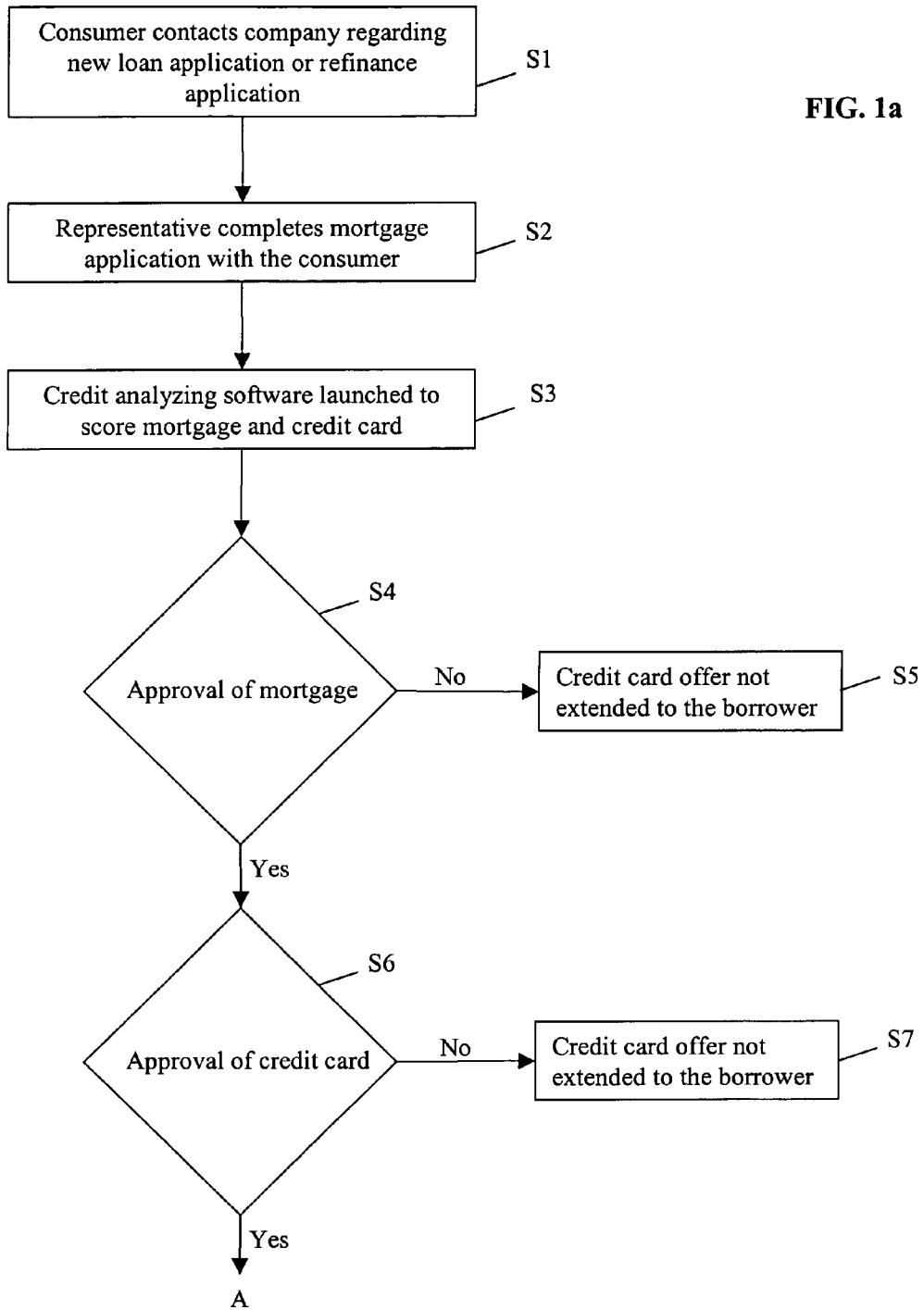
FIGS. 1a-1c show a schematic flow chart that illustrates an example of the process of a consumer obtaining a mortgage rebate credit card for an embodiment of the invention.

As required, detailed features and embodiments of the invention are disclosed herein. However, it is to be understood that the disclosed features and embodiments are merely exemplary of the invention that may be embodied in various and alternative forms. The figures are not necessarily to scale, and some features may be exaggerated or minimized to show details of particular components. Therefore, specific structural and functional details disclosed herein, and any particular combination of these details, are not to be interpreted as limiting, but merely as a basis for claims and as a representative basis for teaching one skilled in the art to variously employ the invention.

Referring now in detail to an embodiment of the present invention, examples of which are illustrated in the accompanying drawings, each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

An embodiment of the present invention provides a credit card designed for a consumer who is also a mortgage debtor, mortgage applicant or potential mortgage debtor. The credit card allows the consumer to pay down his or her mortgage balance just by using the credit card. Whether the consumer uses the credit card for gas, groceries, clothing, or home improvements such as paint, wallpaper, carpeting, or window treatments, a rebate of the credit card applies to the mortgage balance.

In an example of an embodiment of the invention, a credit card for a mortgage debtor/consumer has a one percent rebate without a maximum limit, i.e., a cap. The consumer can reduce the term of his or her mortgage or pay off the mortgage balance at a faster rate using the credit card. For example, assume the consumer has a mortgage balance of $200,000 at a 6.25% annual percentage rate (APR). If the mortgage has a 15-year term, with an annual rebate of $200, the consumer saves $4,927.60 in principal and interest, reducing the term of the mortgage by about two months. If the mortgage has a 15-year term, with an annual rebate of $300, the consumer saves $7,364.13 in principal and interest, reducing the term of the mortgage by about 4 months. If the mortgage has a 30-year term, with an annual rebate of $200, the consumer saves $16,990.40 in principal and interest and the term is reduced by about 13 months. If the mortgage has a 30-year term, with an annual rebate of $300, the consumer saves $25,071.06 and the term is reduced by about 19 months.

For another example, assume a consumer has a mortgage balance of $192,347 with 27 years remaining on the mortgage term and an APR of 6.37%. With an annual rebate of $300, the consumer saves $20,443 in principal and interest and reduces the term of the mortgage by 22 months. With an annual rebate of $200, the consumer saves $13,946 in principal and interest and reduces the term of the mortgage by 10 months. With an annual rebate of $100, the consumer saves $6,127 in principal and interest and reduces the term of the mortgage by 5 months.

Figure 1B:
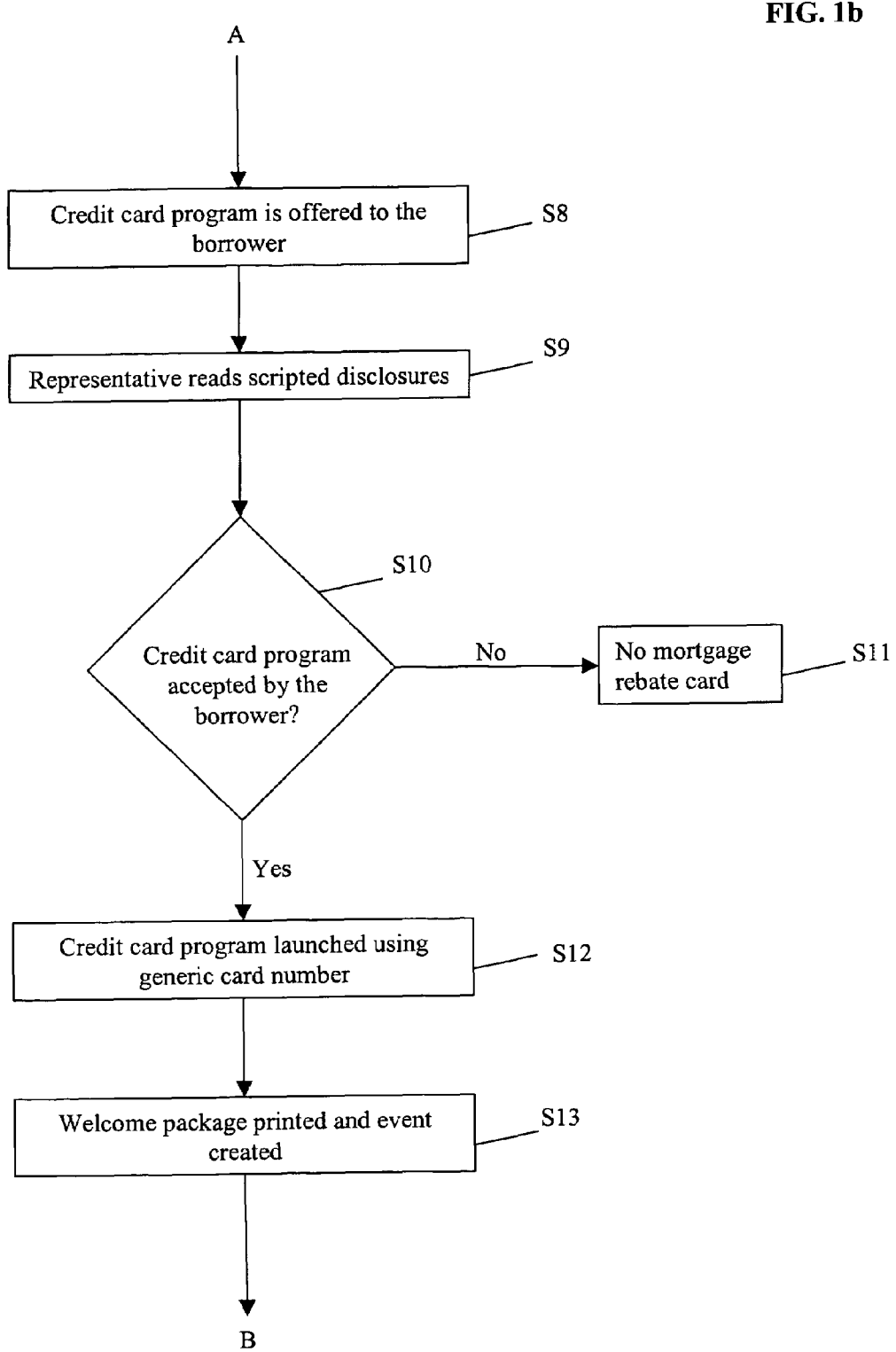
Figure 1C:
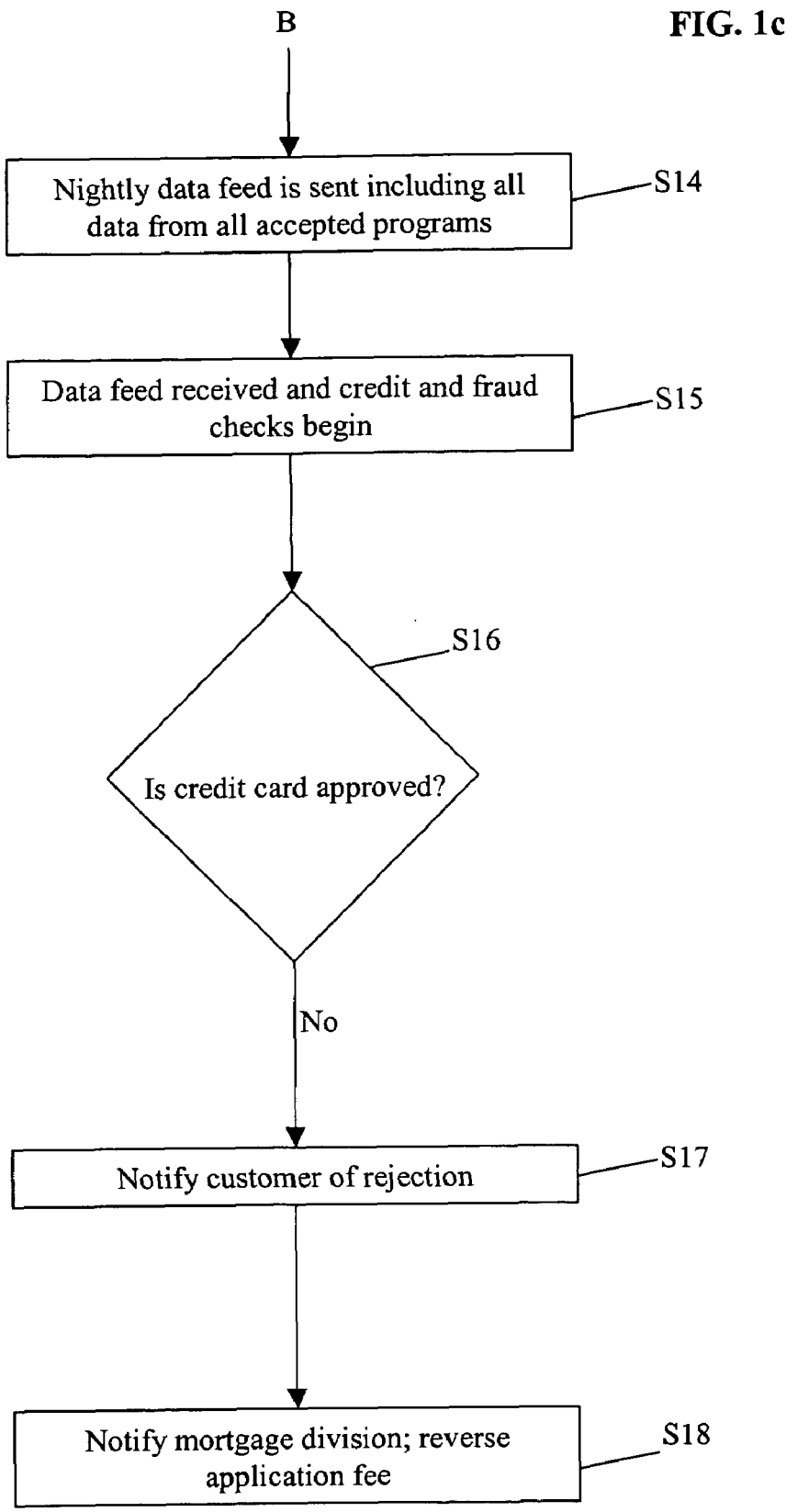
Figure 2:
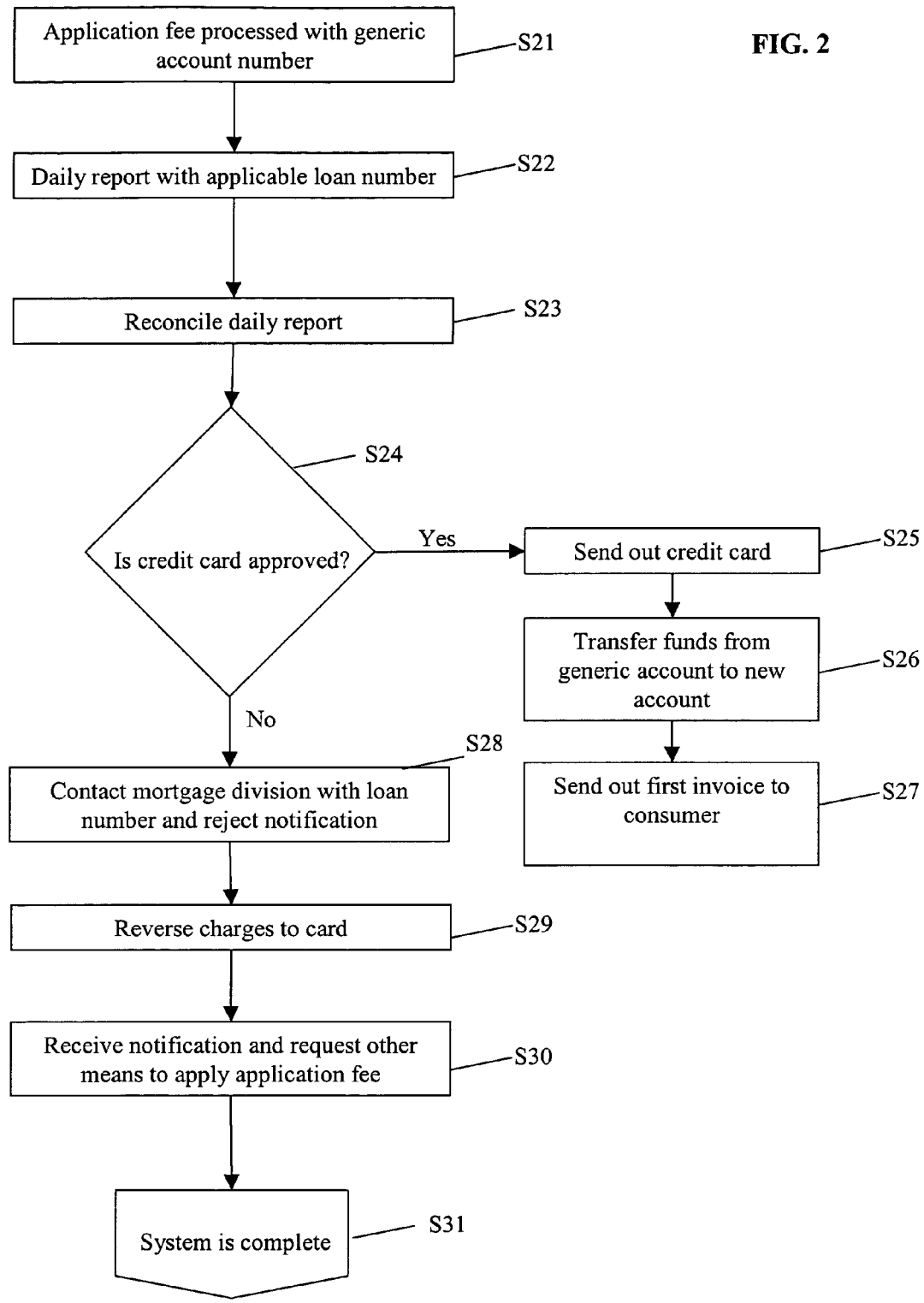
FIG. 2 is a schematic flow chart that illustrates of an example of processing an approval for a mortgage rebate credit card for an embodiment of the invention.

FIGS. 1a-1c show a schematic flow chart that illustrates an example of the process of a consumer obtaining a mortgage rebate transaction card for an embodiment of the invention. Referring to FIGS. 1a-1c, a mortgage rebate credit card is offered by a company with a mortgage company and a credit card division. The terms "mortgage company" and "credit card division" are not limited to a corporate division, and may encompass a company, a unit, or other similar entity. The mortgage company and credit card division are entities of the same corporation, or alternatively, are separate corporate entities. Accordingly, the mortgage company has a mortgage accounting department and the credit card division has a credit card accounting department. A consumer becomes aware of the mortgage rebate credit card, for example, through a solicitation or through the consumer's own investigation and research. In one specific embodiment, at S1, the consumer telephones the mortgage company to request a loan application or a refinance application. At S2, the application is completed, either by the consumer alone or, alternatively, with the assistance of a representative from the mortgage company.

Referring further to FIGS. 1a-1c, at S3, the mortgage company launches credit analyzing software to score the mortgage and credit card application. The mortgage company approves the application for the mortgage at S4. If the mortgage is not approved, the mortgage rebate credit card offer is not extended to the consumer at S5. Additionally, the company evaluates whether to offer a credit card to the consumer at S6. If the consumer is not approved for a credit card, then no credit card offer is extended to the consumer at S7. Alternatively, if the approval of the credit card is analyzed first, and the consumer is not approved, the mortgage rebate credit card offer is not extended to the consumer. However, even though the consumer is not approved for a credit card in this instance, the mortgage application is still reviewed for approval. Nevertheless, if the consumer is approved for the mortgage and the credit card, the mortgage rebate credit card is offered to the consumer at S8. The representative then reads scripted disclosures to the consumer for the credit card at S9.

The consumer has the choice of accepting the offer for the mortgage rebate credit card at S10. If the consumer does not accept the mortgage rebate credit card offer at S11, the mortgage process continues as conducted conventionally in the business. If the consumer accepts the offer for the mortgage rebate credit card, the mortgage company launches a credit card program and uses a generic card number for the consumer at S12. The mortgage accounting department processes the application fee using the generic account number at S21.

The mortgage accounting department sends a daily report with an applicable loan number to the credit card accounting department at S22. The credit card accounting department reconciles a daily report of application fees to determine if the consumer was approved for the credit card at S23. At S24, potential outcomes of the decision include "approved" (card account opened), "pended" (sent to a judgmental queue to be handled within about six days), "pended with a letter" (to be resolved within about three weeks), or "declined". If the card is approved, an account number is provided which the representative uses to port the application fee transaction at S26. If the result is pended with a letter or declined, the representative contacts the consumer and asks for another form of payment at S30. If the result is simply pended, the consumer's record is held off the file for a predetermined period, such as 6 days, and if still pended, the record is sent to the mortgage company as pended and requesting alternative payment at S30.

Referring further to FIGS. 1a-1c, the mortgage division prints a "Welcome" package including a dummy document on the credit card program at S13, creating an event. Triggered by the event, a nightly data feed transfers all data from accepted programs for the day at S14. Credit and fraud analysis is performed on the accepted applications at S15. The approval is processed through the credit card division's credit analyzing software. In analyzing fraud during the application process, policy rules are implemented, including, but not limited to, social security number validation and verification, address verification, and potential fraud alerts. After the application is processed, a file is created with a list of previous days records.

If the consumer is approved for the credit card, the credit card accounting department creates a new account number and sends a credit card to the consumer at S25. The credit card accounting department transfers funds from the generic account to the consumer's new account at S26.

Optionally, a portion of the credit line is available at the point of sale for the consumer to use for payment of mortgage application fees, which typically range from approximately $300 to $800. The credit card accounting department includes the mortgage application fee on the first invoice or credit card statement to the consumer at S27. The consumer then has instant access to a portion of his or her credit line to use in application costs or fees. The consumer receives a rebate for this transaction. The consumer may request, however, that the mortgage application fee be paid by another credit card or account.

If the credit card is not approved at S16, the consumer is notified at S17. Additionally, the credit card accounting department contacts the mortgage company with notification of the rejection at S28. The mortgage accounting department reverses any charges to the card and contacts the representative regarding the rejection at S29. The representative receives notification from the mortgage accounting department at S30. The representative then contacts the consumer to request alternate means to apply the mortgage application fee. The mortgage application process continues as conventional in the business. The company reverses the application fee on the generic account at S18 and does not activate the generic account. At S31, the process is complete. Alternatively, the consumer may obtain the mortgage rebate credit card through conventional means, including, but not limited to, a separate mortgage company and a credit card company.

In another aspect of embodiments of the invention, consumers are allowed to apply for a mortgage rebate transaction card account via a home rebate web application. In this aspect, terms and conditions of the account are displayed for a consumer, and the consumer is allowed to apply by entering personal information, employment and banking information, mortgage lender information, and card option preferences in response to prompts. In another aspect of embodiments of the invention, consumers are allowed to access a home rebate mortgage savings calculator via a home rebate product web page. In this aspect, information about the benefits of the mortgage rebate transaction card account are displayed for the user, and the consumer is allowed to enter information about the consumer's current home mortgage and current transaction card usage in response to prompts. Thereafter, an estimated savings with the mortgage rebate transaction card account is calculated and displayed for the consumer.

In a further aspect of embodiments of the invention, consumers with a mortgage rebate transaction card account are permitted to access a change mortgage lender web page to update their mortgage lender information in the event it changes or was not previously provided. Thus, the consumer is assured that the annual rebate to which he or she is entitled will be paid to the appropriate mortgage lender. In a still further aspect of embodiments of the invention, a consumer who has a mortgage rebate transaction card account is also permitted to access a current rewards/rebate activity web page which lists for the consumer the number of rebates earned by the consumer within the last billing cycle, as well as the number of rebates previously accumulated for the consumer.

Figure 3:
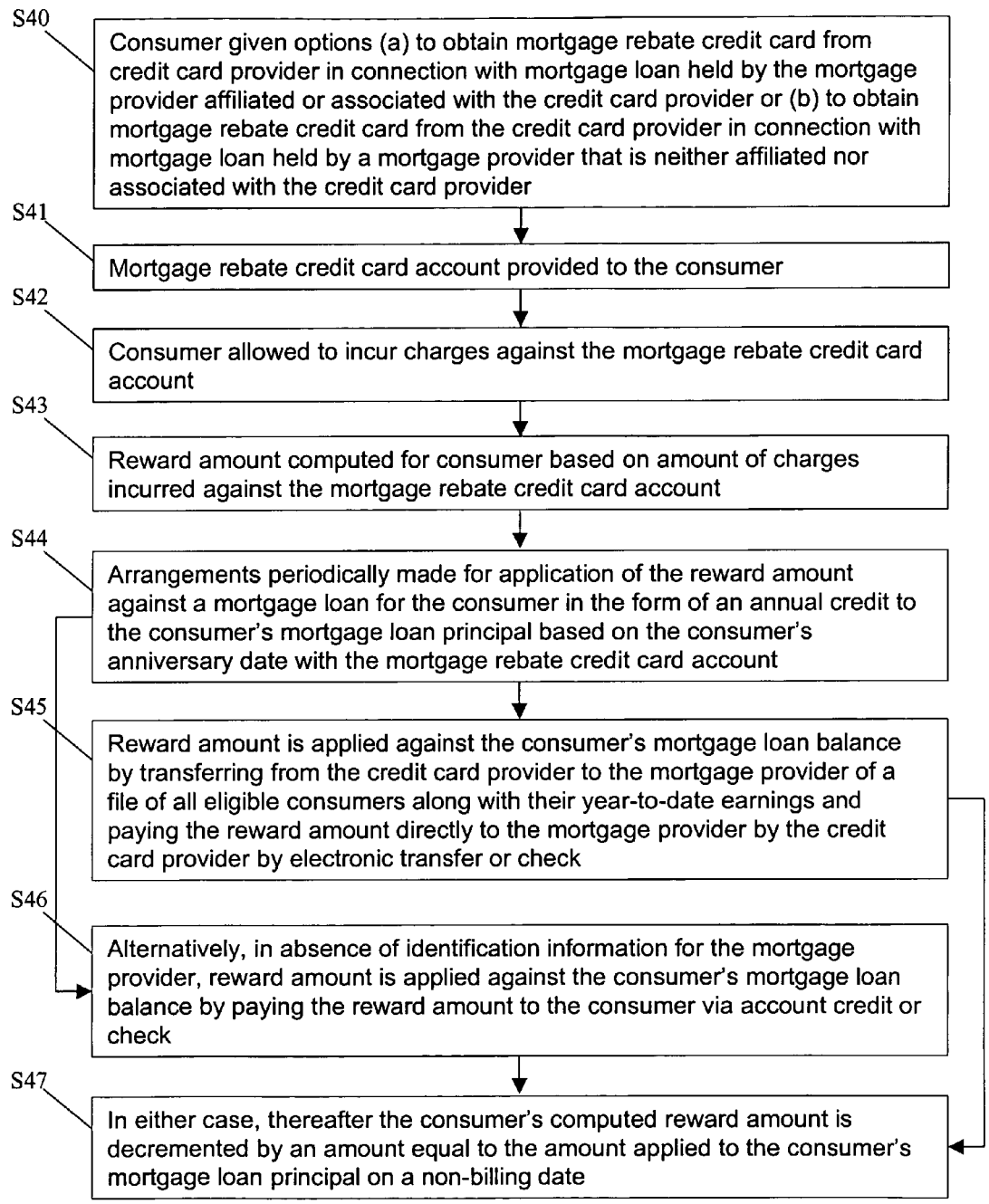
FIG. 3 is a flow chart that illustrates an example of the process of managing the mortgage rebate transaction card account for an embodiment of the invention.

FIG. 3 is a flow chart that illustrates an example of the process of managing the mortgage rebate transaction card account for an embodiment of the invention. Referring to FIG. 3, at S40, a consumer is given options (a) to obtain the mortgage rebate credit card from the credit card provider in connection with a mortgage loan held by a mortgage provider affiliated or associated with the credit card provider or (b) to obtain the mortgage rebate credit card from the credit card provider in connection with a mortgage loan held by a mortgage provider that is neither affiliated nor associated with the credit card provider.

Referring further to FIG. 3, at S41, a mortgage rebate credit card account is provided to the consumer, regardless of whether the consumer elects to obtain the mortgage rebate credit card in connection with a mortgage loan held by the mortgage provider affiliated or associated with the credit card provider or elects instead to obtain the mortgage rebate credit card from the credit card provider in connection with a mortgage loan held by a mortgage provider that is neither affiliated nor associated with the credit card provider.

Referring again to FIG. 3, thereafter at S42, the consumer is allowed to incur charges against the mortgage rebate credit card account for which he or she is invoiced periodically. In addition, at S43, a reward amount is computed for the consumer based on the amount of charges incurred against the mortgage rebate credit card account without any maximum limit. At S44, arrangements are periodically made for application of the reward amount against a mortgage loan for the consumer in the form of an annual credit to the consumer's mortgage loan principal based on the consumer's anniversary date with the mortgage rebate credit card account.

Referring still again to FIG. 3, the reward amount is applied against the consumer's mortgage loan balance by transferring from the credit card provider to the mortgage provider of a file of all eligible consumers along with their year-to-date earnings and paying the reward amount directly to the mortgage provider by the credit card provider by electronic transfer or check at S45, or in the absence of identification information for the mortgage provider, by paying the reward amount to the consumer via account credit or check at S46. In either case, thereafter, at S47, the consumer's computed reward amount is decremented by an amount equal to the amount applied to the consumer's mortgage loan principal on a non-billing date.

Whether the consumer obtains the mortgage rebate credit card through the above process or by alternate means, the consumer will not have to do anything to redeem his or her rewards. Redemption takes the form of an annual credit to the consumer's mortgage principal based upon the consumer's anniversary date with the card product. This is achieved with a file transfer from the credit card division to the mortgage company. The credit card division produces a file of all eligible consumers along with their year-to-date earnings and sends the file to the mortgage company. The credit card division then decreases the annual credit for a particular consumer by an amount equal to the amount that was awarded to that consumer, indicating that the amount of the particular's consumer's annual credit has been redeemed. This is done on a non-billing date.

The rebate from the credit card use is paid directly from the credit card issuer to the mortgage company. The credit card issuer may pay the mortgage company, for example, by electronic transfer or check. Alternatively, the credit card issuer may provide a check to the consumer for payment to the mortgage company. In the absence of any mortgage loan information to the credit card issuer, the rebate is paid directly to the consumer via account credit or check. The consumer thereby pays his or her mortgage at a faster rate using the mortgage rebate credit card.

In some instances, a consumer may change his or her mortgage provider through re-financing or the mortgage provider may sell the mortgage to another company. For these consumers, however, a file is provided with the rebate amount earned by the consumer. A consolidated rebate is transferred to the mortgage company electronically and the credit is posted to the principal balance for each consumer.

In an embodiment of the invention, the mortgage division sets up a process to identify these consumers and validate whether they have an open and active mortgage account with the mortgage company or an account being serviced by the mortgage company. Once the accounts have been identified, the credit is applied. For mortgage accounts that are not found, that are found to be closed, or that are found to have been transferred to another bank or lender, the status is identified in the confirmation file sent back to the credit card division.

If the consumer no longer maintains an open and identifiable mortgage account at the time of redemption, the credit card division rewards the consumer in the form of a statement credit, and then decrements the award balance. It is necessary for consumers to provide the credit card division with up-to-date mortgage account information in order to apply the rebate to their mortgage balances. If the credit card division has no mortgage account data at the time of redemption, a statement credit will be applied instead.

In another embodiment of the invention, the rebate does not apply to certain credit card transactions. For example, rebates may not accumulate on returned purchases, convenience checks, cash advances, balance transfers, finance charges, other account fees, and credits and balances carried over from previous statements, and the like.

Various embodiments of the present invention have now been generally described in a non-limiting manner. It will be appreciated that these examples are merely illustrative of the present invention, which is defined by the following claims. Numerous variations, adaptations, and modifications will be apparent to those of ordinary skill in the art without departing from the spirit and scope of the present invention.

What is claimed is:

1. A method of managing a mortgage rebate transaction card account, comprising:

providing a mortgage rebate transaction card account for a cardholder by a transaction card provider;

allowing the cardholder to incur charges against the mortgage rebate transaction card account;

computing a mortgage rebate amount by the transaction card provider based on an amount of charges incurred against the mortgage rebate transaction card account; and periodically arranging for application of the mortgage rebate amount against a mortgage loan balance for the cardholder by the transaction card provider;

wherein providing the mortgage rebate transaction card account further comprises:

determining, according to pre-defined mortgage and credit card application score parameters, that an applicant qualifies for the mortgage rebate transaction card account when the applicant applies for a mortgage loan;

offering the mortgage rebate transaction card account to the qualified applicant;

applying mortgage loan application-related costs to a temporary transaction card account with a generic account number upon acceptance of the offer by the qualified applicant;

issuing the mortgage rebate transaction card for the qualified applicant with a mortgage rebate transaction card account number to which mortgage loan application-related costs are ported; and including the mortgage loan application-related costs on a first mortgage rebate transaction card statement to the cardholder.

2. The method of claim 1, wherein providing the mortgage rebate transaction card account further comprises providing the mortgage rebate transaction card account in connection with a prospective mortgage loan of the cardholder.

3. The method of claim 1, wherein providing the mortgage rebate transaction card account further comprises providing the mortgage rebate transaction card account in connection with approval of an application for a mortgage loan by the cardholder.

4. The method of claim 1, wherein providing the mortgage rebate transaction card account further comprises providing the cardholder an option for the mortgage rebate transaction card account in connection with a mortgage loan from either one of a mortgage lender that is affiliated or associated with the transaction card provider and a mortgage lender that is not affiliated or associated with the transaction card provider.

5. The method of claim 4, wherein providing the cardholder an option for the mortgage rebate transaction card account in connection with a mortgage loan from either one of a mortgage lender that is affiliated or associated with the transaction card provider and a mortgage lender that is not affiliated or associated with the transaction card provider further comprises providing the mortgage rebate transaction card account in connection with a mortgage loan from a mortgage lender that is affiliated or associated with the transaction card provider.

6. The method of claim 4, wherein providing the cardholder an option for the mortgage rebate transaction card account in connection with a mortgage loan from either one of a mortgage lender that is affiliated or associated with the transaction card provider and a mortgage lender that is not affiliated or associated with the transaction card provider further comprises further comprises providing the mortgage rebate transaction card account in connection with a mortgage loan from a mortgage lender that is not affiliated or associated with the transaction card provider.

7. The method of claim 1, wherein providing the mortgage rebate transaction card account further comprises providing the mortgage rebate transaction card account in connection with a mortgage loan from any mortgage lender regardless of an affiliation or association between the transaction card provider and the mortgage lender.

8. The method of claim 1, wherein computing the mortgage rebate amount by the transaction card provider further comprises computing the mortgage rebate amount without imposing a maximum limit on the mortgage rebate amount.

9. The method of claim 1, wherein periodically arranging for application of the mortgage rebate amount further comprises periodically arranging for application of the mortgage rebate amount directly against the mortgage loan balance for the cardholder.

10. The method of claim 9, wherein periodically arranging for application of the mortgage rebate amount directly against the mortgage loan balance further comprises periodically arranging for application of the mortgage rebate amount directly against the mortgage loan balance in the form of an annual credit to the cardholder's mortgage loan balance.

11. The method of claim 10, wherein periodically arranging for application of the mortgage rebate amount directly against the mortgage loan balance further comprises periodically arranging for application of the mortgage rebate amount directly against the mortgage loan balance in the form of the annual credit based on an anniversary date of the mortgage rebate transaction card account.

12. The method of claim 10, wherein periodically arranging for application of the mortgage rebate amount directly against the mortgage loan balance further comprises paying the reward amount directly to the mortgage lender by the transaction card provider by electronic transfer or check.

13. The method of claim 1, wherein periodically arranging for application of the mortgage rebate amount against the mortgage loan balance further comprises paying the reward amount to the cardholder via account credit or check.

14. The method of claim 1, further comprising decrementing the cardholder's computed mortgage rebate amount by an amount equal to the amount applied to the cardholder's mortgage loan balance.

15. A system for managing a mortgage rebate transaction card account, comprising:
    means for providing a mortgage rebate transaction card account for a cardholder by a transaction card provider;
    means for allowing the cardholder to incur charges against the mortgage rebate transaction card account;
    means for computing a mortgage rebate amount by the transaction card provider based on an amount of charges incurred against the mortgage rebate transaction card account; and
    means for periodically arranging for application of the mortgage rebate amount against a mortgage loan balance for the cardholder by the transaction card provider;
    wherein the means for providing the mortgage rebate transaction card account further comprises:
        means for determining, according to pre-defined mortgage and credit card application score parameters, that an applicant qualifies for the mortgage rebate transaction card account when the applicant applies for a mortgage loan;
        means for offering the mortgage rebate transaction card account to the qualified applicant;
        means for applying mortgage loan application-related costs to a temporary transaction card account with a generic account number upon acceptance of the offer by the qualified applicant;
        means for issuing the mortgage rebate transaction card for the qualified applicant with a mortgage rebate transaction card account number to which mortgage loan application-related costs are ported; and
        means for including the mortgage loan application-related costs on a first mortgage rebate transaction card statement to the cardholder.

* * * * *